(12) United States Patent
Osborne et al.

(10) Patent No.: US 10,380,675 B2
(45) Date of Patent: Aug. 13, 2019

(54) METHOD, MEDIUM, AND SYSTEM FOR MANIPULATION OF DYNAMICALLY ASSEMBLED ECOMMERCE WEB PAGES

(71) Applicant: Oracle International Corporation, Redwood Shores, CA (US)

(72) Inventors: Reed Osborne, Cambridge, MA (US); Patrick Beagan, Arlington, MA (US); Susan Parrish, Wellesley, MA (US); Uday Chandra Tatiraju, Alexandria, VA (US); Charles Trowbridge, Marblehead, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 483 days.

(21) Appl. No.: 15/058,586

(22) Filed: Mar. 2, 2016

(65) Prior Publication Data
US 2017/0053343 A1    Feb. 23, 2017

Related U.S. Application Data

(60) Provisional application No. 62/206,448, filed on Aug. 18, 2015.

(51) Int. Cl.
*G06Q 30/00* (2012.01)
*G06Q 30/06* (2012.01)

(52) U.S. Cl.
CPC .............. *G06Q 30/0643* (2013.01)

(58) Field of Classification Search
CPC .................................. G06Q 30/0643
See application file for complete search history.

(56) References Cited

U.S. PATENT DOCUMENTS

| 6,738,079 | B1 | 5/2004 | Kellerman et al. |
| 7,620,570 | B2 | 11/2009 | Albazz et al. |
| 7,783,967 | B1 * | 8/2010 | Carnell ................. G06F 16/958 715/234 |
| 7,853,577 | B2 | 12/2010 | Sundaresan et al. |
| 8,027,884 | B2 | 9/2011 | Bezos et al. |
| 8,392,281 | B1 | 3/2013 | Bashir et al. |

(Continued)

OTHER PUBLICATIONS https://webdesign.tutsplus.com/articles/user-experience-designing-form-validation-the-right-way--webdesign-681 (Year: 2010).*

(Continued)

*Primary Examiner* — Matthew E Zimmerman
(74) *Attorney, Agent, or Firm* — Potomac Law Group, PLLC

(57) ABSTRACT

Systems and methods for manipulating dynamically rendered content are provided. At the outset, a first visual representation of backend data sources and a set of rules is generated. The first visual representation includes a structural overview of the backend data sources and the rules. A second visual representation of the backend data sources and the rules is also generated. The second visual representation includes an end-user rendering based on the backend data sources and the rules. A change to one of the backend data sources or rules is received within the first visual representation. Simultaneously, the change is rendered within the second visual representation.

20 Claims, 13 Drawing Sheets

(56) References Cited

U.S. PATENT DOCUMENTS

| | | | |
|---|---|---|---|
| 8,566,704 B1* | 10/2013 | Le Bescond de Coatpont | G06F 17/24 434/345 |
| 8,924,335 B1 | 12/2014 | Trefler et al. | |
| 2003/0090514 A1 | 5/2003 | Cole et al. | |
| 2009/0037949 A1* | 2/2009 | Birch | G06Q 30/02 725/34 |
| 2013/0326345 A1* | 12/2013 | Haggart | G06F 17/24 715/255 |

OTHER PUBLICATIONS

Feb. 2014—https://web.archive.org/web/20140217073522/https://www.tutorialspoint.com/json/json_quick_guide.htm (Year: 2014).* https://webdesign.tutsplus.com/articles/user-experience-designing-fornn-validation-the-right-way-webdesign-681 (Year: 2010).*

CoreMedia, "The Perfect Match—Six Keys to Building a Healthy Content and Commerce Relationship", http://www.coremedia.com/linkableblob/view/-/33280/data/4/-/_9I9I9x/-/CoreMedia-LiveContext-for-IBM-WebSphere-Perfect-Match-Guide-US-EN-.pdf, last downloaded Mar. 2, 2016.

CoreMedia, "Contextual Marketing with CoreMedia Live Context", for Use with SAP Web Channel Experience Management 2.0, Business Solutions Guide: Contextual Marketing, http://www.coremedia.com/linkableblob/view/-/29180/data/2/-/_utcq30z/-/BSG-LiveContext-A4-.pdf, last downloaded Mar. 2, 2016.

CoreMedia, "Selecting a Web Content Management System", Business Solutions Guide, http://www.coremedia.com/linkableblob/view/-/33978/data/3/-/_12xsq92/-/BSG-Selecting-a-WCM-System-US-.pdf, last downloaded Mar. 2, 2016.

Marco Deluca, "Enabling business users to preview in customer segments in WebSphere Commerce V7", IBM Developer Works, Nov. 4, 2009, http://www.ibm.com/developerworks/websphere/tutorials/0911_deluca/0911_deluca-pdf.pdf, last downloaded Mar. 2, 2016.

IBM, "Management Center: Store preview", http://www-01.ibm.com/support/knowledgecenter/SSZLC2_7.0.0/com.ibm.commmerce.management-center.doc/concepts/cpvpreview.htm, last downloaded Mar. 2, 2016.

IBM, "Management Center: Generating and sharing store preview URLs", http://www-01.ibm.com/support/knowledgecenter/api/content/nl/en-us/SSZLC2_7.0.0/com.ibm.commerce.management-center.doc/tasks/tpvgenerate.htm, last downloaded Mar. 2, 2016.

Adobe, "Adobe Experience Manager: Commerce Datasheet", http://wwwimages.adobe.com/content/dam/Adobe/en/solutions/web-experience-management/pdfs/datasheet-aem-ecommerce-ue.pdf, last downloaded Mar. 2, 2016.

KnowledgePath, "Blog—The Benefits of Endeca Experience Manager", ittp://www.knowledgepath.com/index.php/the-benefits-of-endeca-experience-manager/, Nov. 14, 2013.

Certona, "Blog—Finding your style at Etail West 2015 with Certona", http://www.certona.com/finding-your-style-at-etail-west-2015-with-certona/, last downloaded Mar. 2, 2016.

IBM, "Management Center: Commerce Composer Overview", https://www-304.ibm.com/support/knowledgecenter/SSZLC2_7.0.0/com.ibm.commerce.management-center.doc/concepts/cpzpagecompoverhtm, last downloaded Mar. 2, 2016.

* cited by examiner

100

200

300

300

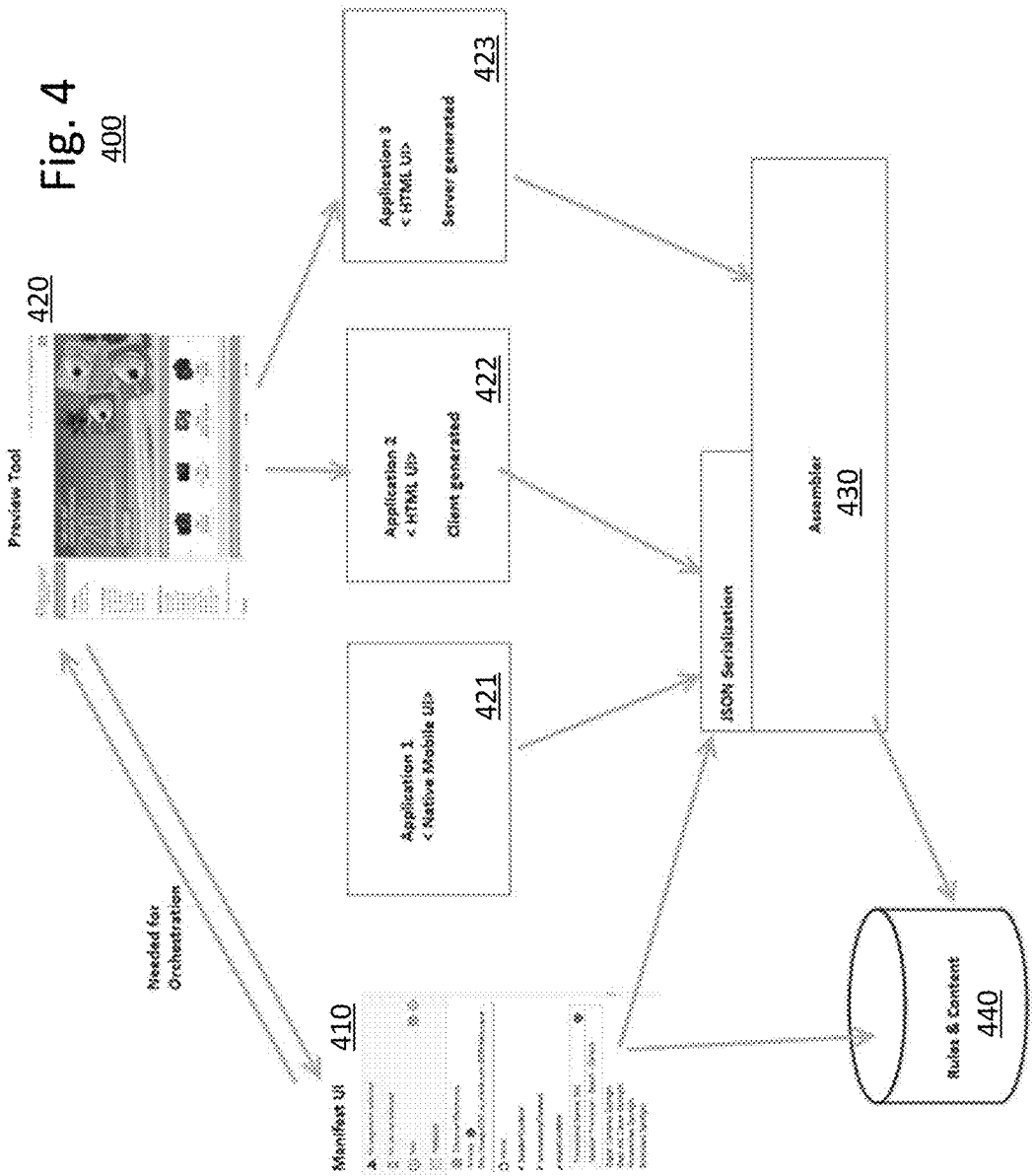

500

600

600

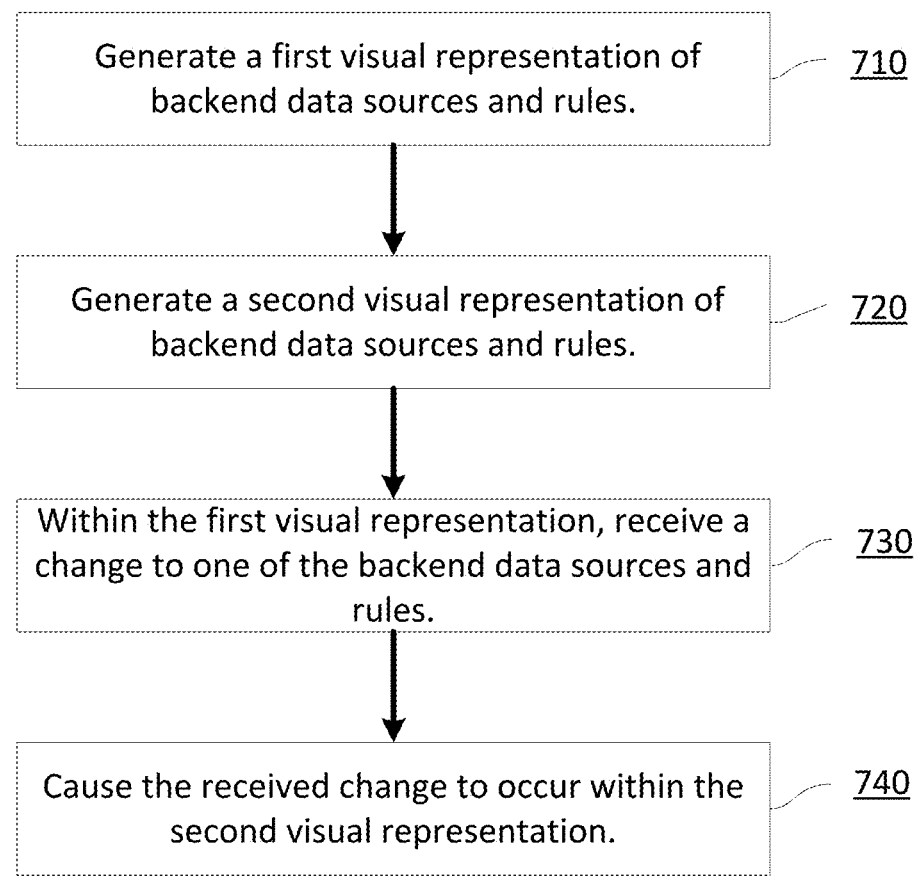

800

METHOD, MEDIUM, AND SYSTEM FOR MANIPULATION OF DYNAMICALLY ASSEMBLED ECOMMERCE WEB PAGES

PRIORITY APPLICATION

This application claims the benefits of U.S. Provisional Patent Application No. 62/206,448 filed on Aug. 18, 2015, which is incorporated herein by reference in its entirety.

FIELD

The embodiments of the present invention generally relate systems and methods for information retrieval and, more particularly, to dynamically assembled web pages.

BACKGROUND

As Internet commerce continues to expand, web sites continue to display increasing amounts of information and grow in complexity. For example, a merchant's web page may sell a variety of commercial products and product accessories. In this example, the various products and product accessories may be produced by a variety of manufacturers and may be available in numerous option combinations, such as combinations of color, size, storage capacity, etc. As a result, the merchant's web site may be capable of rendering thousands of web pages to display the products and product accessories for sale.

During the rendering or modification of a web site, efficient information retrieval from backend databases is an increasingly challenging problem, especially when multiple disparate data sources are used to form a single web page. In particular, the merchant's business user may encounter difficulties when making changes to the web site. Efficiently implementing such changes on one or more subsets of web pages has so far been difficult.

In addition, web sites may be assembled from multiple data sources. In addition, business users are typically non-technical and frequently do not understand the configuration of underlying data sources used to assemble web pages. Further, related management tools do not adequately provide the ability for business users to predict how changes to content will appear in the context of the end user's experience. As a result, business users often operate in a non-interactive mode, and only discover the implications of their design changes after the fact.

SUMMARY

The embodiments of the present invention are generally directed to systems and methods for manipulation of dynamically assembled e-commerce web pages that substantially improve upon the related art.

Features and advantages of the embodiments are set forth in the description which follows, or will be apparent from the description, or may be learned by practice of the invention.

For example, systems and methods for manipulating dynamically rendered content are provided. At the outset, a first visual representation of backend data sources and a set of rules is generated. The first visual representation includes a structural overview of the backend data sources and the rules. A second visual representation of the backend data sources and the rules is also generated. The second visual representation includes an end-user rendering based on the backend data sources and the rules. A change to one of the backend data sources or rules is received within the first visual representation. Simultaneously, the change is rendered within the second visual representation.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4 illustrates a block diagram of a system according to an example embodiment of the present invention.

FIG. 7 illustrates a method for utilizing a manifest according to an example embodiment of the present invention.

DETAILED DESCRIPTION

Figure 1:
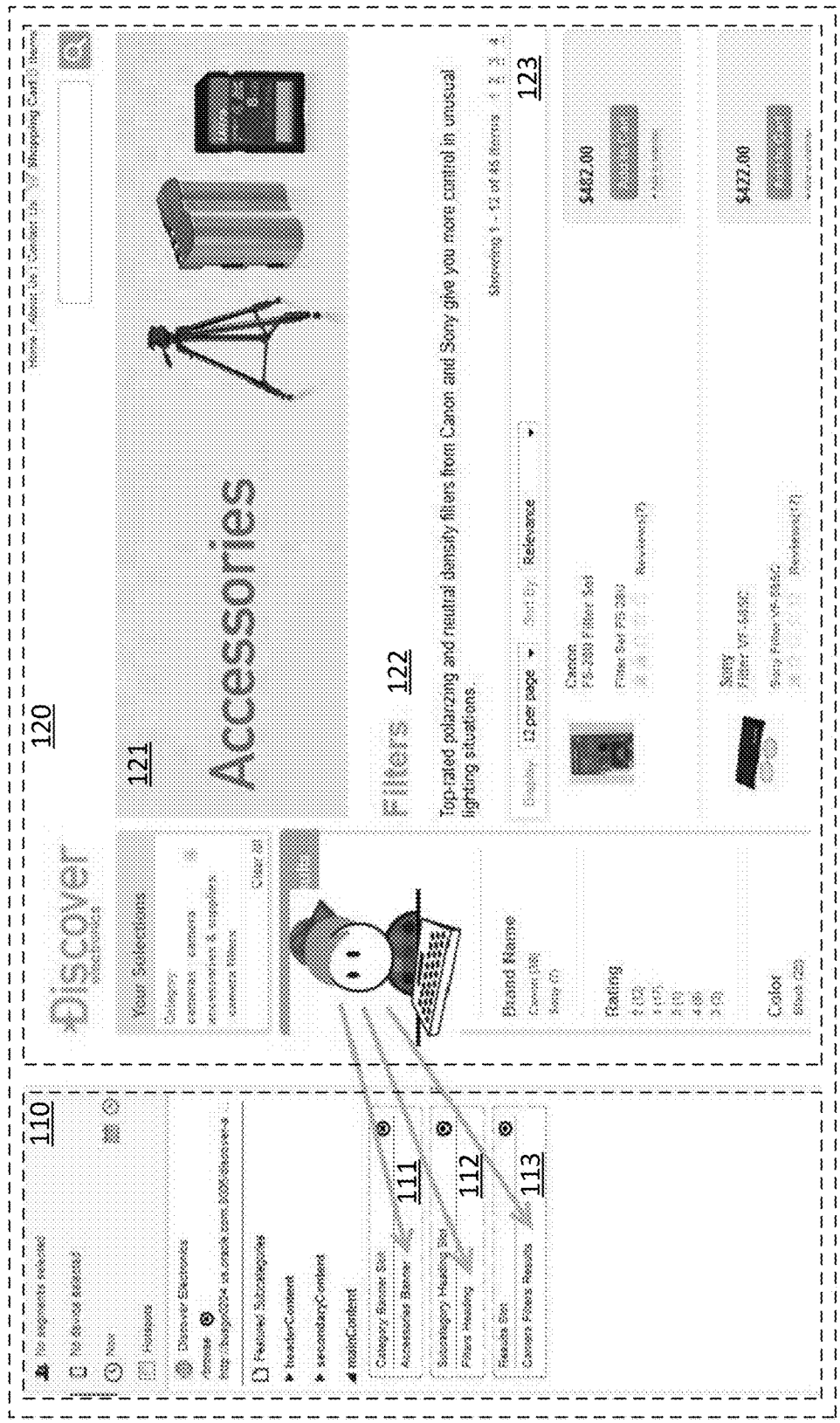
FIG. 1 illustrates a manifest according to an example embodiment of the present invention.

According to the various embodiments of the present invention, rules-driven page assembly leads to highly dynamic web sites with a large number of distinct shopper experiences. By adopting the various embodiments described herein, dynamic web sites are no longer overwhelming to manage. In addition, the embodiments enable the business users to explore and quickly assess any page or simulate any shopper experience including categories, user segments, devices, search terms, brands, future dates, and the like. Embodiments provide this as well as controls and visibility into rules evaluation and page assembly details.

With embodiments of the present invention, non-technical business users can now operate effectively without understanding the backend data sources and the underlying rules assembly model. Since most business users are familiar with using the storefront web site itself, embodiments incorporate a web site view for all analyzing and authoring activities. Non-technical users can now build and debug complex rule interactions. It also is a more natural fit for more technical users to perform their tasks more quickly and effectively.

Reference will now be made in detail to the embodiments of the present invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, user interfaces and associated methods for using an electronic device are described. In some embodiments, the electronic device is a portable communication device such as a mobile phone, smartphone, tablet, and the like. The user interface may include a touchscreen and/or other input/output devices. It should be understood, however, that the user interfaces and associated methods may be applied to other devices, such as personal computers, laptops, and the like which may include one or more other physical user-interface devices, such as a keyboard and or mouse.

The electronic device may support a variety of applications, such as Internet browser, text messenger, experience management, and various other applications. The various applications that may be executed on the electronic device may use at least one common physical user-interface device. In addition, a common physical architecture of the electronic device may support a variety of applications with user interfaces that are intuitive and transparent. In the discussion that follows, the experience management application is used as an example embodiment, but it should be understood that the user interfaces and associated methods of the experience management application may be readily applied to other applications.

FIG. 1 illustrates a manifest 100 according to an example embodiment of the present invention.

As shown in FIG. 1, manifest 100 may include a plurality of sections and subsections, such as manifest view 110 and corresponding web page view 120. The subsections of manifest view 110 may be simultaneously displayed alongside or adjacent to subsections of corresponding web page view 120. In addition, the subsections of manifest view 110 and web page view 120 may be synchronized such that changes made within manifest view 110 are displayed in web page view 120 in real-time. In addition, subsections of manifest view 110 may correspond to subsections of web page view 120. For example, accessories banner 111, filters heading 112, and filters results 113 of manifest view 110 may correspond respectively to accessories banner 121, filters heading 112, and filters results 123 of web page view 120.

Manifest view 110 provides a graphical overview of backend data sources and rules that dynamically generate the web site content. Alongside manifest view 110, web page view 120 depicts the respective content areas and/or elements according to the configurations made via manifest view 110. By visually separating these dynamic aspects from the web page rendering, manifest 100 enables the business users to make changes to web page view 120 in a more intuitive manner.

For example, web page view 120 may be manipulated by making changes to one or more content representations in manifest view 110, such as accessories banner 111, filters heading 112, and filters results 113. Web page view 120 mimics the rendering of web pages to end users, such as shoppers. Accordingly, manifest view 110 may provide real-time visual feedback to the business users when making changes to the backend data sources and rules. In addition, manifest view 110 enables the business users to visually associate the backend data sources and rules with the specific areas of content on respective web pages.

In some instances, when a subsection of manifest view 110 is selected (e.g., mouse-, finger-, or hover-over), a hotspot mode may highlight corresponding subsections of web page view 120. Here, the hotspot mode may visually assist business users manipulating the manifest view to further identify relevant portions of web page view 120.

The backend data sources displayed by manifest view 110 may include any combination of server(s) and database(s) for storing product information, product accessory information, promotional information, sales data, sales related data, tax rates, sales rules, header content, catalog repositories, ratings or reviews repositories, recommendations engines, inventory repositories, content management systems, media repositories, hashtag trends, and the like. To manage the variety of backend data sources, the server(s) and database (s) may further include rules for configuring and assembling the web pages. Here, a business, especially a business that sells a wide range of products and accessories, may employ thousands of rules that apply business logic to display of sets of products or content based on the identity of the shopper and/or the shopper's recent activity. Manifest view 110 enables the business user to view the rules that execute within the context of a particular shopper, and to further view rules that were processed but did not execute. The business user may view these analytics alongside the rendering of the web page.

Although countless configurations of backend data sources and rules are feasible, some examples will now be described. For example, a shopper from the Northeast United States may be presented with banners depicting snow blowers in early winter. In this example, a rule based on snow blower purchase histories identifies that snow blowers are most likely to be purchased by shoppers in cold climates and/or periods. In another example, a rule may display predetermined content (e.g., October banner) during predetermined time periods (e.g., the month of October). In some instances, a rule may be configured to display different products or different banners based on the type of shopper. Here, user profiles may be maintained to identify and/or categorize the type of shopper (e.g., based on shopper activity). For example, the shopper's purchasing history may indicate a brand affinity for BrandA. Here, a rule may be generated to depict products originating from BrandA as the shopper browses the various categories. In a similar example, the shopper's shopping history may indicate an interest in a category of products, such as CategoryB, and a rule may be used to ensure that the shopper is presented with products associated with CategoryB. In another example, a rule may apply differing sales tax rates depending on the end-user's location.

The content representations within manifest view 110, such as accessories banner 111, filters heading 112, and filters results 113, may include a variety of abstractions of web page content. Here, manifest view 110 may represent one or more selected content elements into abstract and flattened forms that compensate for deficiencies in the rendered web page. Although some of the content representations may be static and directly included on a web page, some may be further evaluated by the rules engine. In some instances, content representations may not be rendered for the shopper, but rather may be included in the web page response for the purposes of search engine optimization or coding (e.g., JavaScript, CSS, etc.) for the rendering system. In some embodiments, the content representations may include text entry fields, drop-down menus that expand and collapse to display additional subsections, toggle boxes and the like.

When the experience management application is launched, the manifest view 110 may not be configured. For example, when business users launch the experience management application, manifest view 110 may not be launched until a web page is selected for preview. Upon section of a web page for preview, subsections such as accessories banner 111, filters heading 112, and filters results 113 may be generated based on the selected web page. These subsections, or page components, may include a variety of information such as a web site icon, web site name for the previewed web page, web site path (e.g., URL) to the previewed page, banner information, and the like.

In addition, the page components may define context information. For example, the web site path may be a URL, and may further include context information. The context information may identify a project name and preview state such that business users may store and share particular site previews. Context information may be determined by business users and the preview site path copied to a clipboard for sharing purposes. In another example, page components that are related to one or more projects may be listed adjacent to the corresponding project names. Alternatively, the menus of page components may expand to show the related projects.

In addition, the business users may use manifest 100 to browse a shopping experience of interest. As the rules-driven web page assembly may generate highly dynamic web sites with a large number of distinct shopper experiences, manifest 100 enables the business users to explore and quickly assess any web page or simulate any shopper experience including user segments, devices, search terms, brands, future web site releases, and the like. For example, the embodiments provide easy selection of different parameters of the shopper experience such as an output device, user segment, and date and time of viewing. Here, the selected parameters may vary the web page view 120. Moreover, changes may be made to the web site content of particular shopping experiences.

Manifest 100 may load sections and subsections asynchronously instead of within a single page load. For example, a text search box may asynchronously load automatically suggested terms when the business user starts typing. In another example, manifest 100 may add new sections and subsections as they are loaded from the dynamic web site assembler.

As a result, the business users have the ability to work with rules and content in a real-time environment from the perspective of the end user. In addition, business users may be presented with only the rules and content relevant to the previewed web page. Any changes that the business users make may be persisted to the backend servers. In some instances, the backend servers may be configured to operate within a preview environment such that data may be pushed to a production environment at a later point in time. Thus, changes made by the business users within manifest view 110 may be saved and persisted such that the business user may view a synchronized view of the webpage rendering. Here, changes made via manifest 100 may initially be locally rendered on the fly within web page view 120. Subsequently, if the business user is satisfied with the rendered contents in web page view 120, the backend servers and rules may be updated as well.

As is now understood, the embodiments provide a simplified perspective based on the content viewable by an end user. In addition, manifest 100 provides a simplified perspective into the management of backend data sources and rules. Accordingly, the simplified perspective may be easily grasped by the business users who may not have knowledge relating to the backend data sources used to dynamically generate web pages.

Figure 2A:
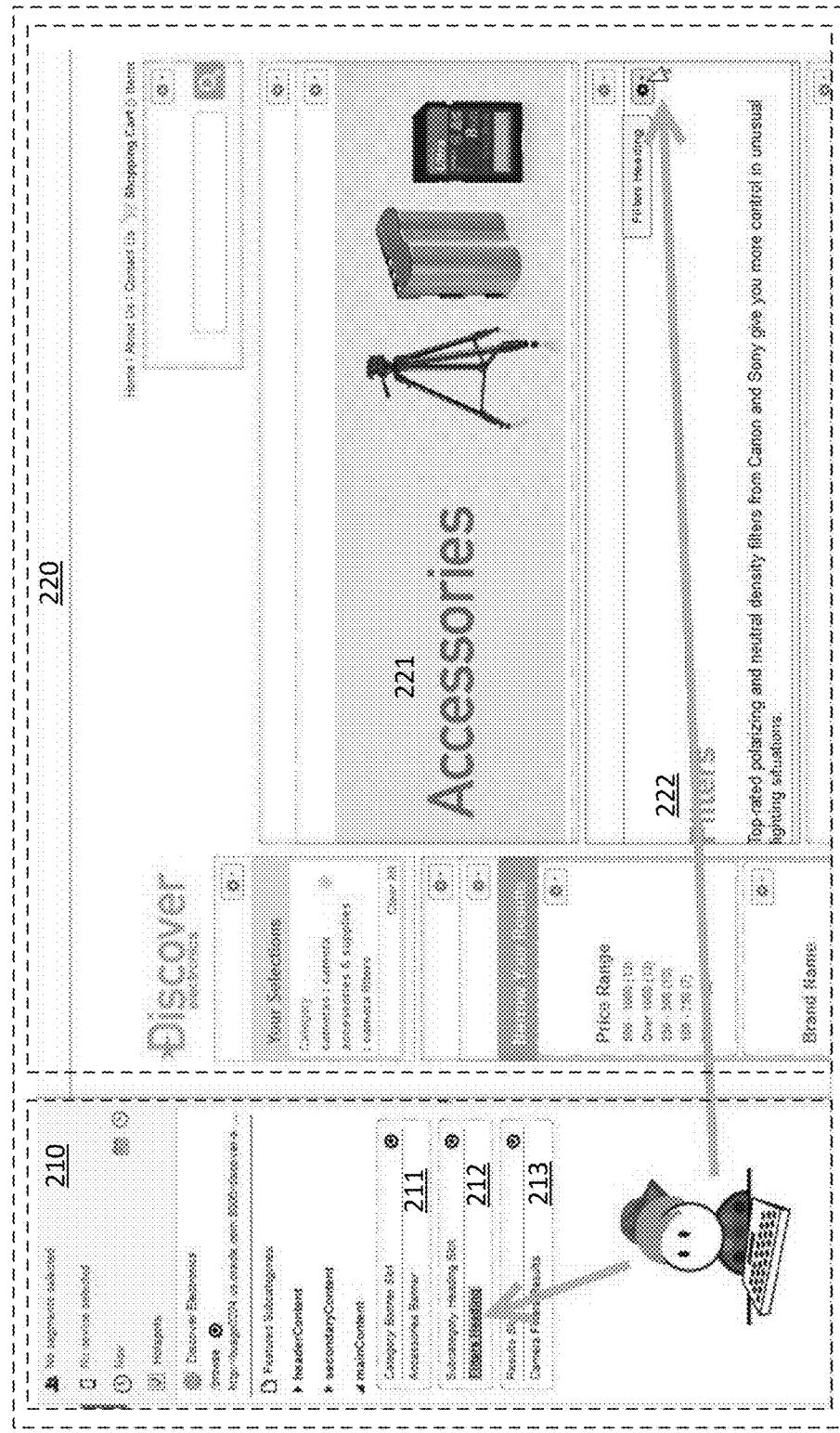
FIGS. 2A and 2B illustrate a manifest according to another example embodiment of the present invention.
Figure 2B:
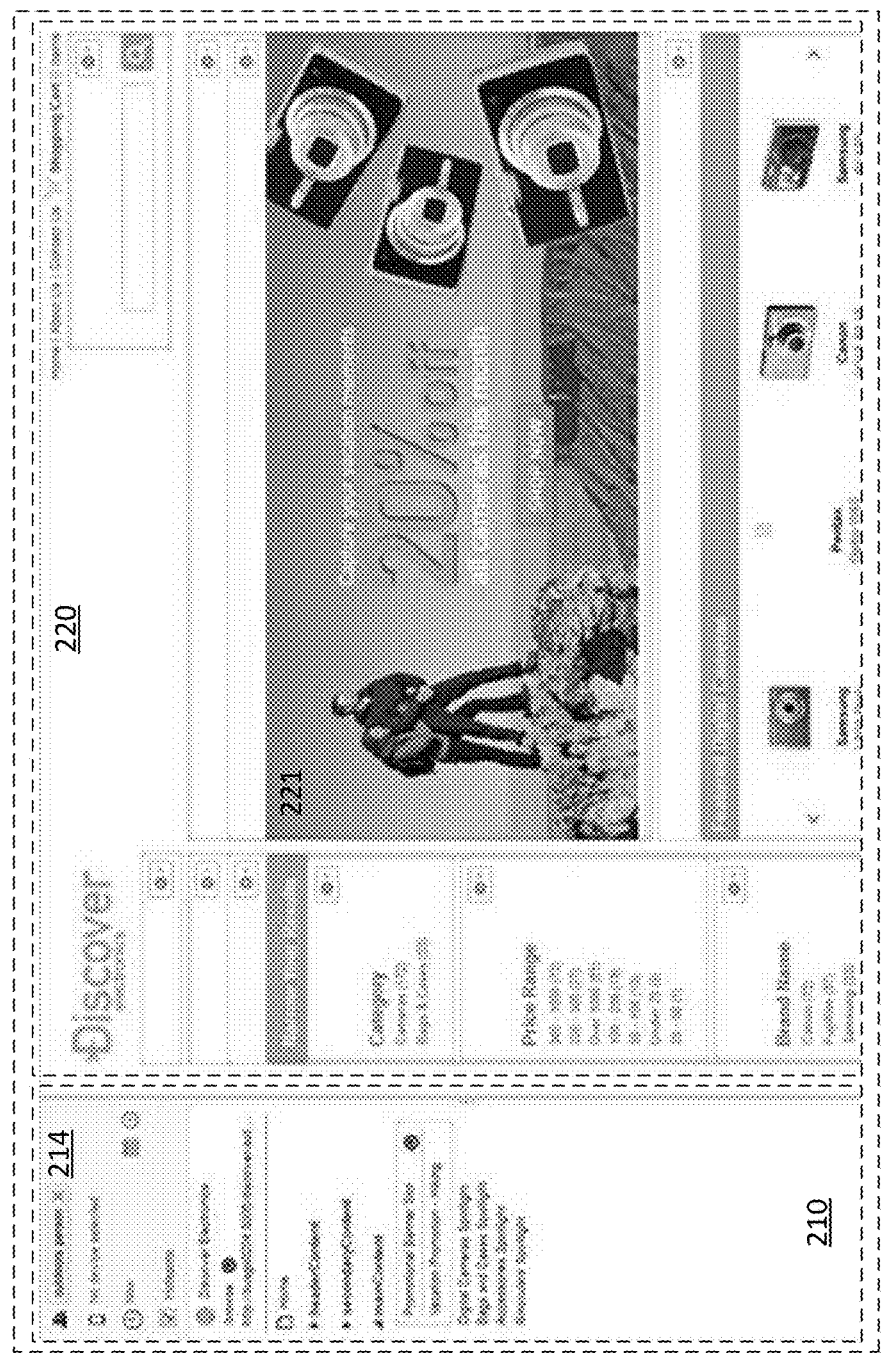

FIGS. 2A and 2B illustrate a manifest 200 according to another example embodiment of the present invention.

As shown in FIG. 2A, a manifest 200 may include manifest view 210 and corresponding web page view 220. In addition, subsections of manifest view 210 may correspond to subsections of web page view 220. For example, accessories banner 211, filters heading 212, and filters results 213 of manifest view 210 may correspond respectively to accessories banner 221, filters heading 222, and filters results (not shown) of web page view 220.

The business users may interact with manifest 200 in order to make changes to the backend data sources and rules. The changes to the backend data sources and rules may be displayed to the business user in manifest view 210 and web page view 220 in real-time. For example, the business user may change the filters heading 212. As a result, filters heading 222 in corresponding web page view 220 also may be changed to reflect the changes made by the business user to filters heading 212.

Although changes to the filters heading are discussed as an example, changes also may be applied to other elements and representations of content of the manifest view 210 and corresponding web page view 220. For example, the business user may want to display a promotional banner instead of the accessories banner as a page component on numerous web pages. In some instances, promotion banners and other content may be directed to a specific type of customer. For example, FIG. 2B illustrates a banner 221 directed to an "outdoorsy" type of shopper 214.

Accordingly, the business users may efficiently manipulate dynamically assembled web pages without understanding the underlying rules assembly model. Instead, backend data sources and rules are displayed in a simplified view provided by manifest view 210. As most business users are familiar with using the web site itself, manifest 200 uses web page view 220 to facilitate such changes to the web pages. Thus, manifest 200 enables non-technical business users to efficiently execute changes to web site content.

Figure 3A:
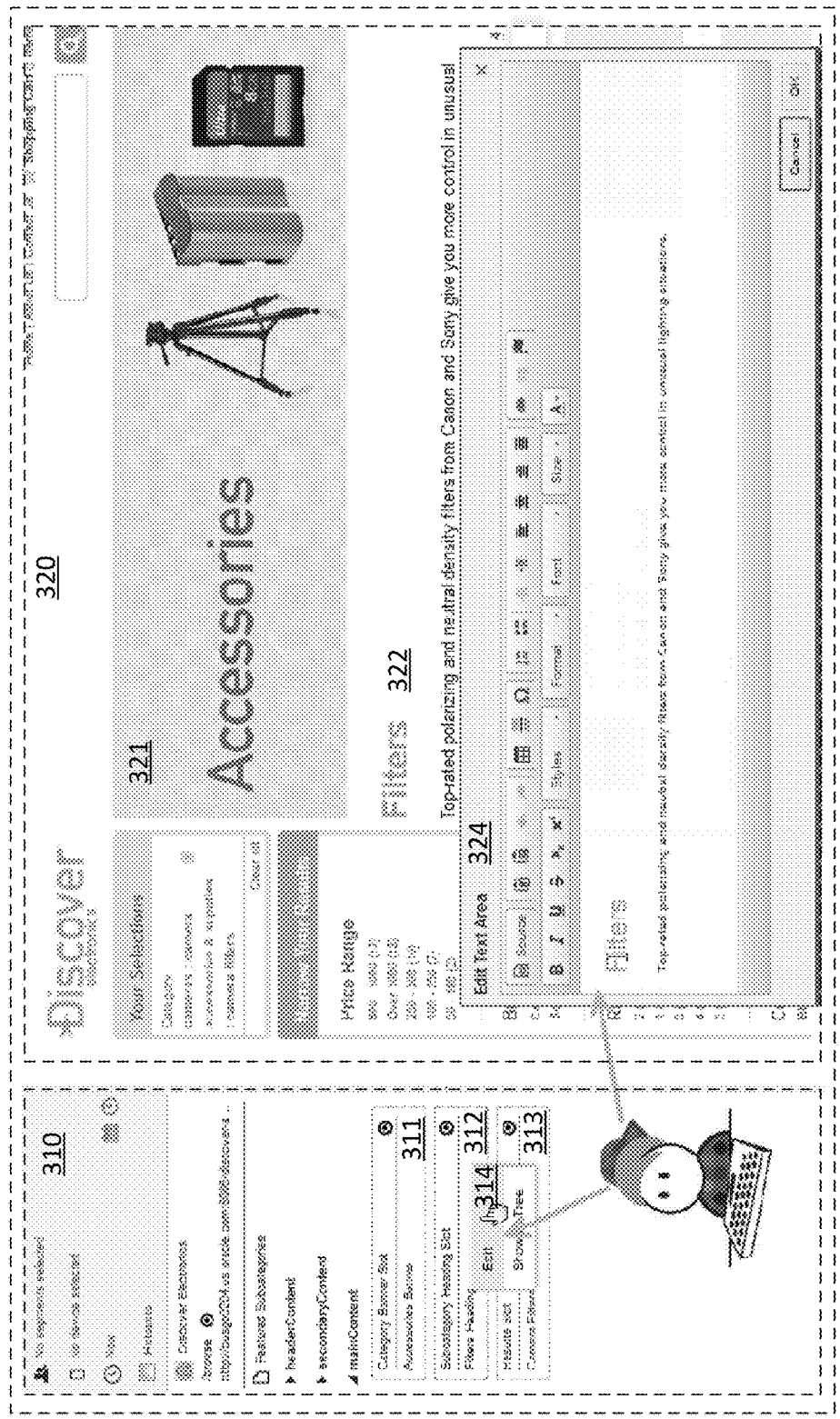
FIGS. 3A and 3B illustrate a manifest according to another example embodiment of the present invention.
Figure 3B:
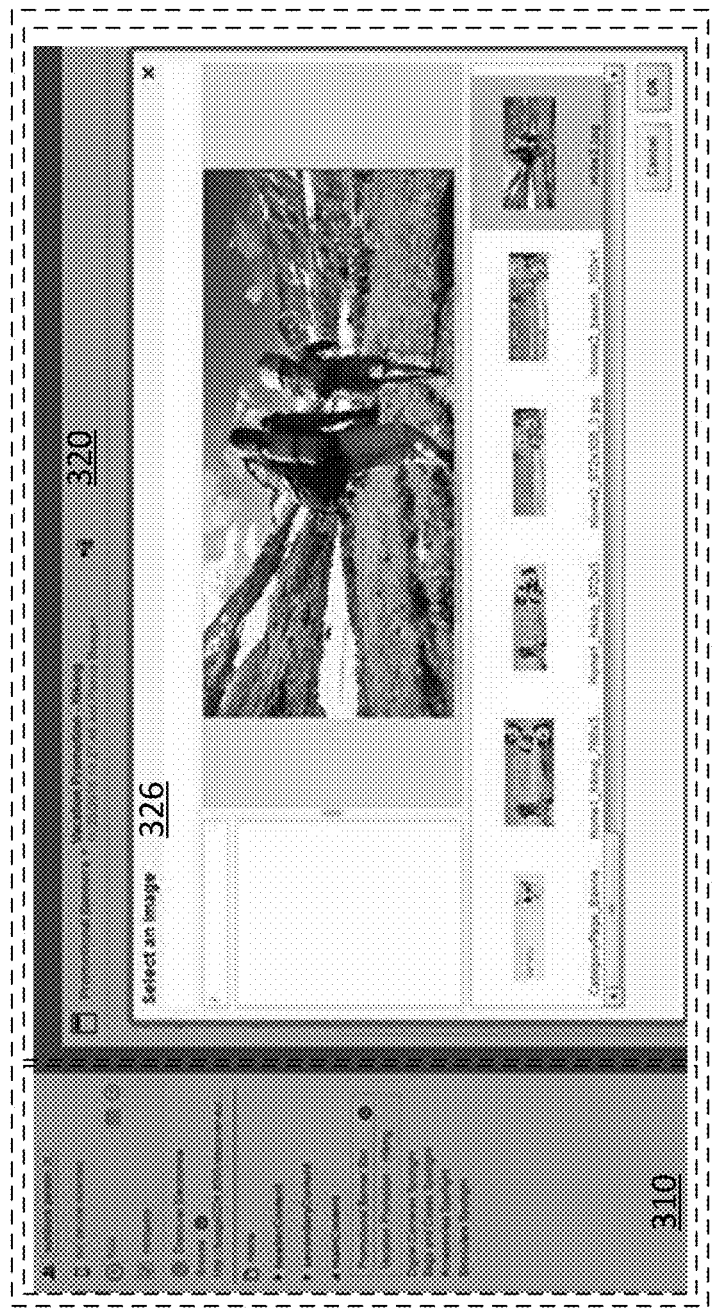

FIGS. 3A and 3B illustrates a manifest 300 according to another example embodiment of the present invention.

As shown in FIG. 3A, manifest 300 includes manifest view 310 and corresponding web page view 320. In addition, the subsections of manifest view 310 may correspond to the subsections of web page view 320. For example, accessories banner 311, filters heading 312, filters results 313, and edit filters heading menu 314 of manifest view 310 may correspond respectively to accessories banner 321, filters heading 312, filters results (not shown), and edit filters heading window 324 of web page view 320.

To apply changes to the filters heading 322, the business user may select edit filters heading menu 314. As a result, edit filters heading window 324 may be used to prompt the business user for changes to the content of filters heading 322. In some instances, the edit filters heading window may be asynchronously rendered within web page view 320. FIG. 3B illustrates an alternative example in which the business user applies changes to the accessories banner (321, as shown in FIG. 3A). In particular, edit banners window 326 prompts the business user to select an image to be used as the new accessories banner.

Although the example embodiment depicted in FIG. 3 relates to changes applied to filters heading 322, it should be understood that any section of web site view 320 may be altered using manifest view 310. For example, accessories banner 321 or the filter results (not shown) may also be changed.

With the embodiments, the details and structure of the backend data sources and rules is shown side by side with the rendered page to provide ease of comparison. Embodiments provide visual feedback to allow the user to associate the backend data sources and rules with the specific areas of content on the render web page.

FIG. 4 illustrates a block diagram of a manifest system 400 according to an example embodiment of the present invention.

As shown in FIG. 4, manifest system 400 includes manifest modules 410, preview modules 420, assembler 430, and backend data sources and rules 440. Preview modules 420 may generate page previews in a variety of manners including native mobile UI (user interface) 421, client-generated HTML UI 422, and server-generated HTML UI 423. Each of UI 421, client-generated HTML UI 422, and server-generated HTML UI 423 is an example of various rendering technologies that can be used in this working environment. Alternative rendering technologies, such as Play framework, Microsoft.Net, PHP, Adobe flash, JSP, and the like may also be used.

Embodiments of the present invention are independent of any rendering technology and are not specific to HTML. For example, manifest system 400 is operationally independent of any particular rendering technology. Accordingly, the embodiments are also advantageous and may represent assembled content that may or may not be displayed by preview modules 420. This functionality is provided with minimal additional effort by the developers.

Manifest modules 410 may be coupled to preview modules 420 and backend data sources and rules 440 in order to provide one or more manifest views representing simplified or flattened views of the rendered content and the backend data sources and rules. In addition, manifest modules 410 may provide a representation of any form of server side content assembly in a visual and easy to understand manner. In some instances, manifest modules 410 may represent assembled content that may or may not be displayed by preview modules 420. Accordingly, manifest modules 410 improve upon related WYSIWYG (what you see is what you get) previews.

Assembler 430 is a server application that assembles the content from various backend data sources. Assembler 430 dynamically assembles web pages based on information retrieved from backend data sources and rules 440. In addition, assembler 430 may incorporate changes made by the business users and cause the changes to be rendered by any of the preview modules 420-423. In some instances, assembler 430 may generate and maintain a runtime assembly log for each web page. In addition, assembler 430 may include JavaScript Object Notation ("JSON") modules that are configured to transfer payloads of data between systems such that it enables a web application to retrieve the appropriate dynamic content based on a user's navigation state or other triggers.

FIG. 4 further illustrates example orchestration configurations. For example, as the business user starts typing in the search box and suggestions are shown, the manifest view is updated to represent the additional content that is now present on the web page. Alternatively, the business user can use the manifest to update the banners or other contents, and the web page view is synchronized to reflect the changes.

Figure 5:
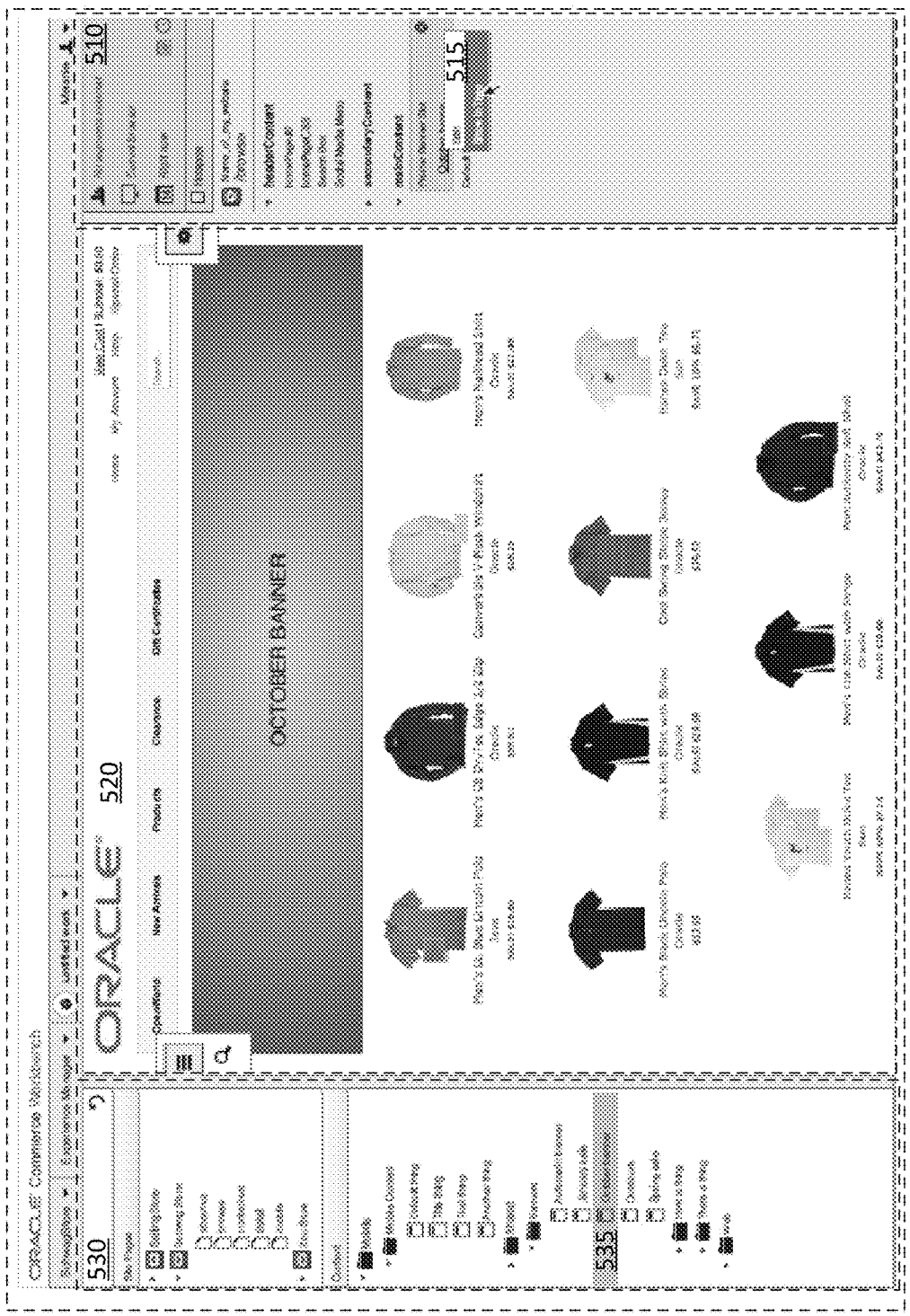
FIG. 5 illustrates a manifest according to another example embodiment of the present invention.

FIG. 5 illustrates a manifest 500 according to another example embodiment of the present invention. As shown in FIG. 5, manifest 500 may include manifest view 510, web page view 520, and data tree view 530. Data tree view 530 may provide an alternative, but still simplified, structural overview of backend data sources and rules. Here, subsections of manifest view 510 may be illustrated within data tree view 530. For example, an October banner 515 of manifest view may be displayed within data tree view 530, as October banner 535. In addition, data tree view 530 provides user input elements within manifest view 510 from which the business user can navigate into the underlying set of rules and content.

Figure 6A:
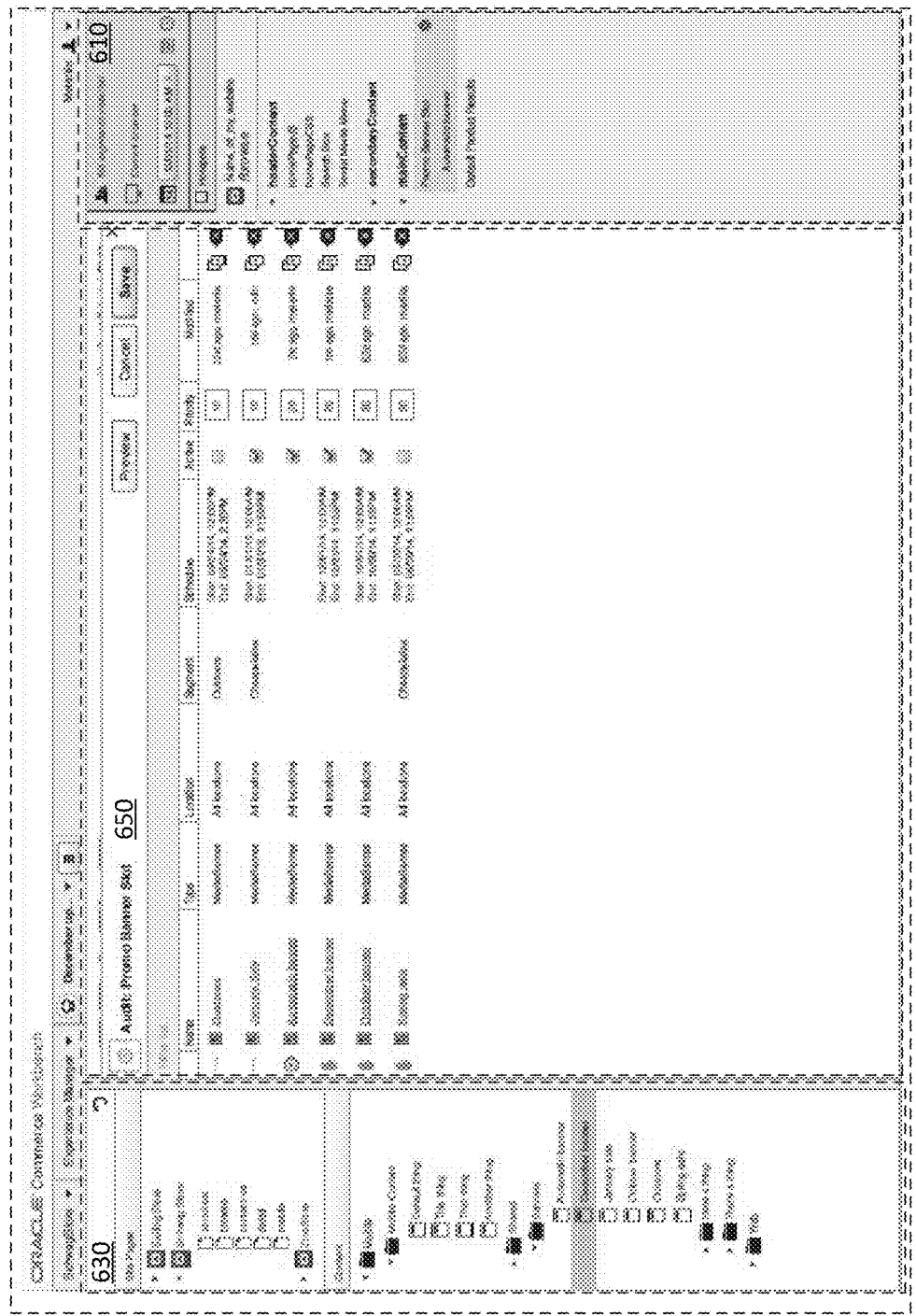
FIGS. 6A and 6B illustrate a manifest according to another example embodiment of the present invention.
Figure 6B:
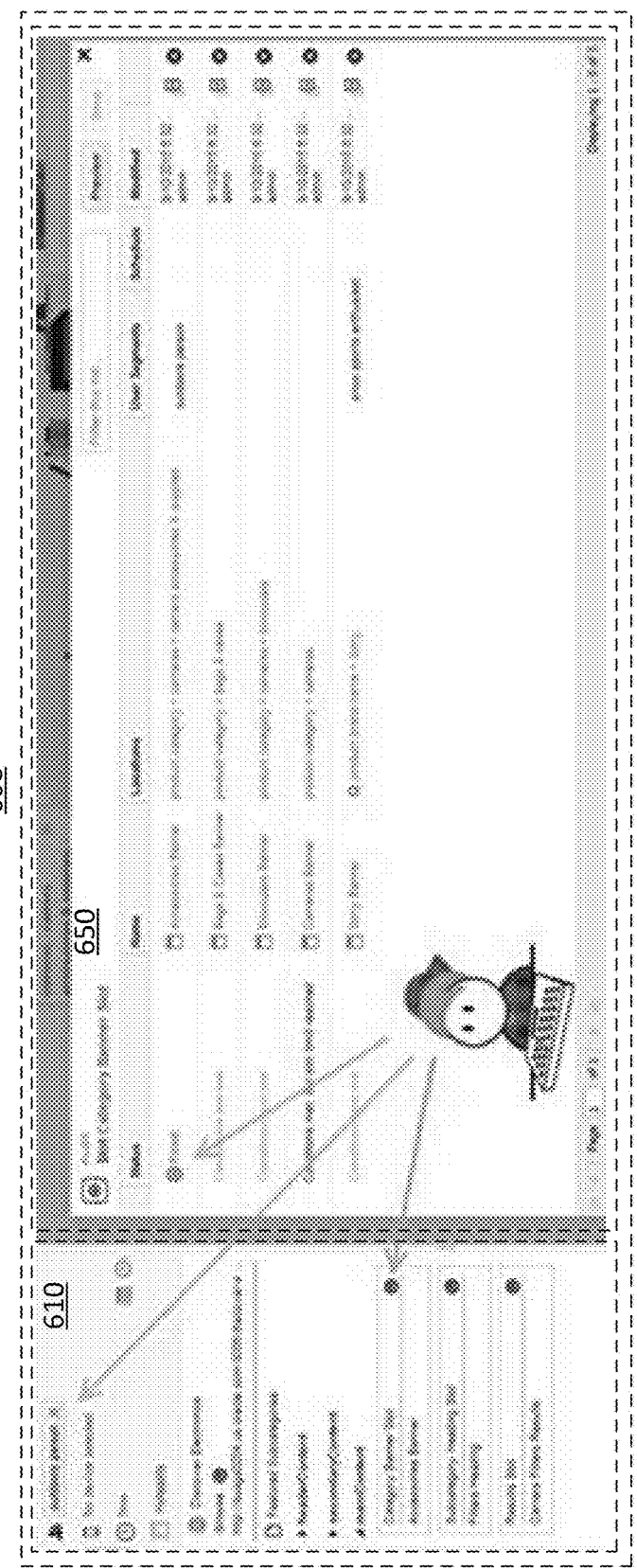

FIGS. 6A and 6B illustrate a manifest 600 according to another example embodiment of the present invention. As shown in FIG. 6A, manifest 600 may include manifest view 610, data tree view 630, and audit view 650. Audit view 650 may be configured to compare expected data content to actual data content in any of the manifest view 610, data tree view 630, and web page view (not shown in FIG. 6). Differences may be logged and displayed to the business users in audit view 650. Audit view 650 enables the business users to quickly identify possible problems in the operation of the web site. Typically, manifest view 610 is configured to illustrate a summary of audit view 650 by only illustrating the rules and/or content that were actually triggered and displayed (i.e., not the full list). If the business user desires to display other rules that were considered, audit view 650 may be retrieved, as shown in FIG. 6B.

FIG. 7 illustrates a flow diagram 700 for utilizing the manifest according to an example embodiment of the present invention. In some configurations, the functionality of the flow diagram of FIG. 7 (and FIG. 8 below) may be implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, flow diagram 700 generates a first visual representation of backend data sources and rules, at 710. The first visual representation may include a manifest view that provides a simplified or flattened structural overview of backend data sources and rules that dynamically generate web site content.

Flow diagram 700 also generates a second visual representation of backend data sources and rules, at 720. The second visual representation may be configured to render web pages based on backend data sources and rules.

The first and second visual representations may be simultaneously displayed, and may be displayed adjacent to one another by the experience management application. In addition, the first and second visual representations may be synchronized such that changes made within the first visual representation are displayed in the second visual representation in real-time. As a result, the experience management application may provide the business users with the ability to work with backend rules and content in a real-time environment from the perspective of the end user. In addition, the business users may be presented with only the rules and content relevant to the first and second visual displays.

Next, at 730, the business users may change one of the backend data sources and rules within the first visual representation. For example, the second visual representation may be manipulated by making changes to one or more content representations of the first visual representation. Lastly, the change(s) invoked by the business users are rendered within the second visual representation, at 740.

Figure 8:
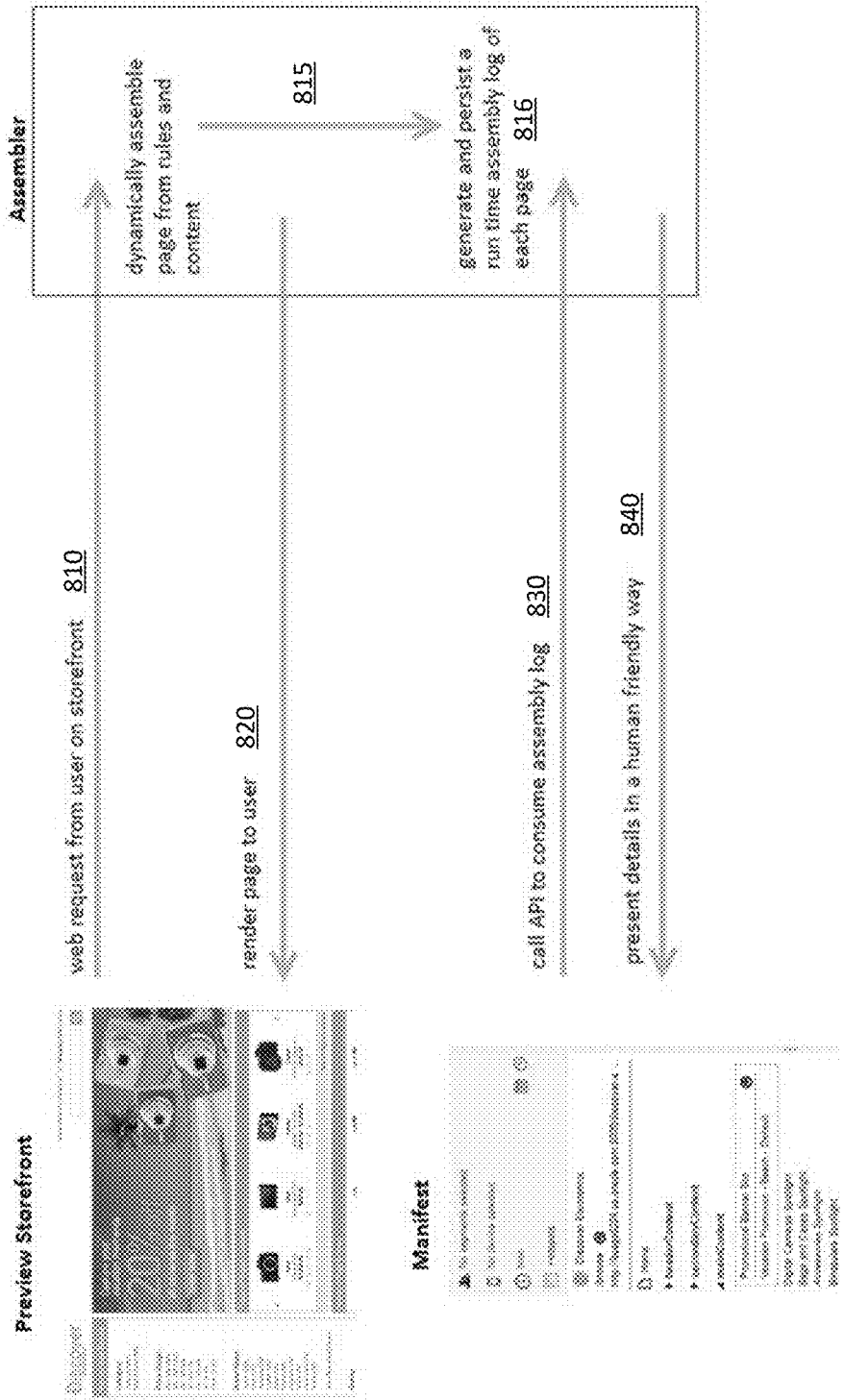
FIG. 8 illustrates a method for utilizing a manifest according to another example embodiment of the present invention.

FIG. 8 illustrates a flow diagram 800 for utilizing a manifest according to another example embodiment of the present invention.

At the outset, flow diagram 800 receives a request from the business user to preview one or more web pages, at 810. Here, the assembler dynamically assembles the requested web page(s) from the backend data sources and rules, at 815. In addition, the flow diagram may also generate and maintain a run time assembly log for each requested web page preview, at 816. In some instances, the assembly log may be updated in real-time. Next, at 820, the requested web pages may be rendered to the device of the business user.

Subsequently, the flow diagram 800 may receive a request to provide the assembly log to business users via an application programming interface ("API"), at 830. Lastly, at 840, the API may render the assembly log to the device of the business user in a human-friendly way.

Example algorithms for rending web pages and the corresponding assembly logs will now be provided. In the example algorithms that follow, techniques for searching among various page components such as rules (rule set A), web pages (rule set B), and promotional banners (rule set C) will be provided:

```
Assembly Algorithm:
    => return first matching rule from [A]
Rule Set [A] :: Page/Request Rules
if (request-path matches "/browse/*")
    => return first matching rule from [B]
if (request-path matches "/about-us")
    => return "About Us" page { ... }
if (request-path matches "/shipping-information"
        and current-date between 12/20/2015 and 12/24/2015) then
    => return "Shipping Information - Last Minute Shopping" page { ... }
if (request-path matches "/shipping-information") then
    => return "Shipping Information" page { ... }
otherwise
    => return HTTP 404
Rule Set [B] :: Search/Browse Pages
if (user-search-terms matches "shipping information")
    => return redirect to "/shipping-information"
otherwise
    => return "Default Product Browse" page {
        header { ... }
        left-column { ... }
        main-section {
            { return first matching rule from [C] }
            { fetch results list }
        }
    }
Rule Set [C] :: Search/Browse Banners
if (user-segment matches "outdoors person"
        and current-date between 11/1/2015 and 4/1/2016))
    => return "Skiing" banner
if (user-segment matches "outdoors person")
    => return "Backpackers" banner
if (user-nav-filter matches "category:cameras/accessories")
    => return "Camera Accessories" banner
otherwise
    => return nothing
```

Figure 9:
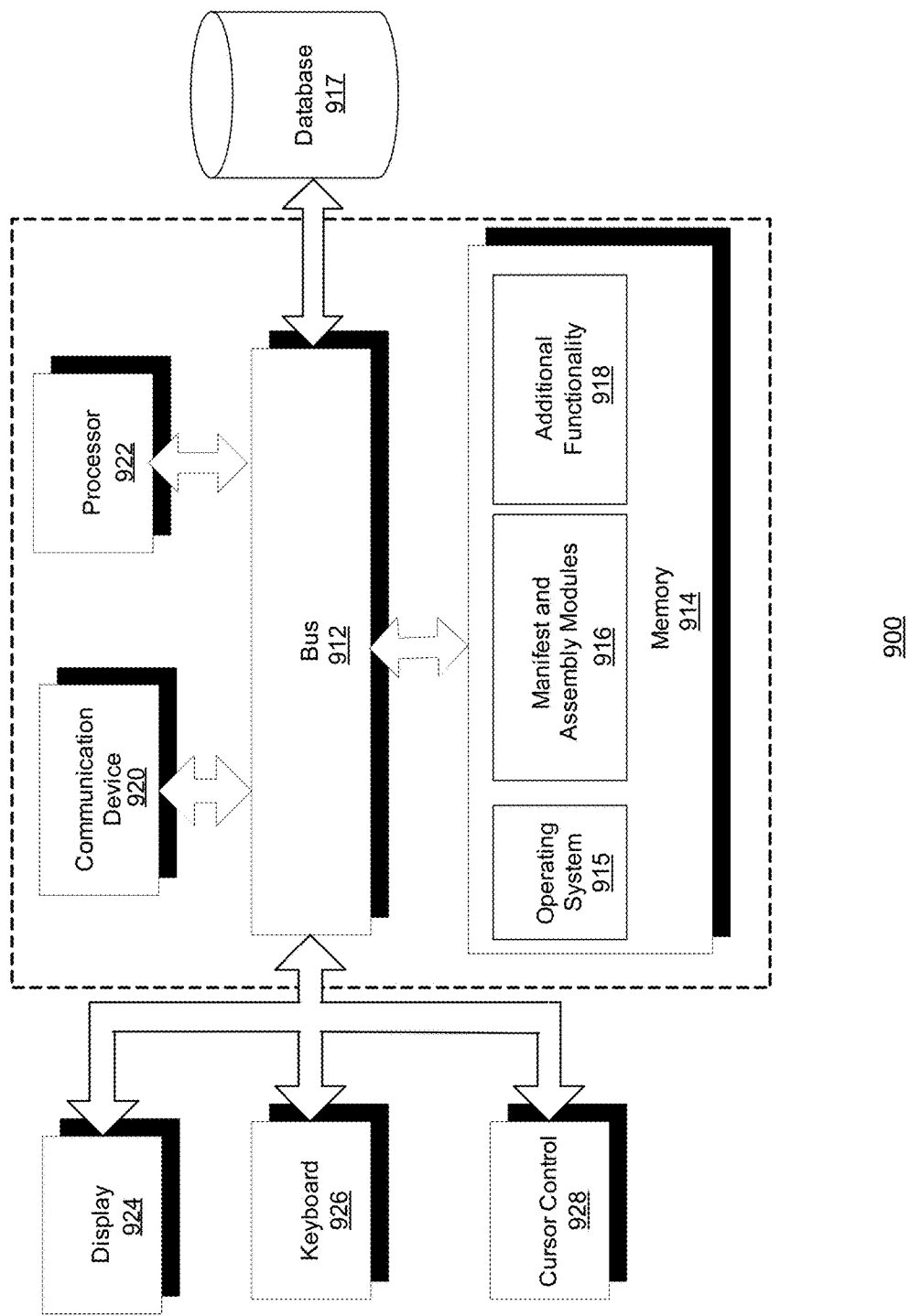
FIG. 9 is a block diagram of a computer server/system in accordance with an example embodiment of the present invention.

FIG. 9 is a block diagram of a computer server/system 900 in accordance with an example embodiment of the present invention.

As shown in FIG. 9, system 900 may include a bus device 912 and/or other communication mechanism(s) configured to communicate information between the various components of system 900, such as processor 922 and memory 914. In addition, communication device 920 may enable connectivity between processor 922 and other devices by encoding data to be sent from processor 922 to another device over a network (not shown) and decoding data received from another system over the network for processor 922.

For example, communication device 920 may include a network interface card that is configured to provide wireless network communications. A variety of wireless communication techniques may be used including infrared, radio, Bluetooth, Wi-Fi, and/or cellular communications. Alternatively, communication device 920 may be configured to provide wired network connection(s), such as an Ethernet connection.

Processor 922 may comprise one or more general or specific purpose processors to perform computation and control functions of system 900. Processor 922 may include a single integrated circuit, such as a micro-processing device, or may include multiple integrated circuit devices and/or circuit boards working in cooperation to accomplish the functions of processor 922. In addition, processor 922 may execute computer programs, such as operating system 915, manifest and assembly modules 916, and other applications 918, stored within memory 914.

System 900 may include memory 914 for storing information and instructions for execution by processor 922. Memory 914 may contain various components for retrieving, presenting, modifying, and storing data. For example, memory 914 may store software modules that provide functionality when executed by processor 922. The modules may include an operating system 915 that provides operating system functionality for system 900. The modules may further include manifest and assembly modules 916 that provide manipulation of dynamically assemble e-commerce web pages.

Non-transitory memory 914 may include a variety of computer-readable medium that may be accessed by processor 922. For example, memory 914 may include any combination of random access memory ("RAM"), dynamic RAM (DRAM), static RAM (SRAM), read only memory ("ROM"), flash memory, cache memory, and/or any other type of non-transitory computer-readable medium.

Although shown as a single system, the functionality of system 900 may be implemented as a distributed system. For example, memory 914 and processor 922 may be distributed across multiple different computers that collectively comprise system 900. In one embodiment, system 900 may be part of a device (e.g., smartphone, tablet, computer, etc.), and system 900 may provide manipulation of dynamically assembled ecommerce web pages. In another embodiment, system 900 may be separate from the device, and may remotely provide the aforementioned functionality for the device.

Processor 922 is further coupled via bus 912 to a display 924, such as a Liquid Crystal Display ("LCD"). A keyboard 926 and a cursor control device 928, such as a computer mouse, are further coupled to communication device 912 to enable a user to interface with system 900.

System 900 can be part of a larger system. Therefore, system 900 can include one or more additional functional modules 918 to include the additional functionality. A database 917 is coupled to bus 912 to provide centralized storage for modules 916 and 918 and store user profiles, transactions history, etc.

Although illustrated as a single system, the functionality of system 900 may be implemented as a distributed system. Further, the functionality disclosed herein may be implemented on separate servers or devices that may be coupled together over a network. Further, one or more component of system 900 may not be included. For example, for functionality of a user client, system 900 may be a smartphone that includes a processor, memory and a display, but may not include one or more of the other components shown in FIG. 9.

Figure 10:
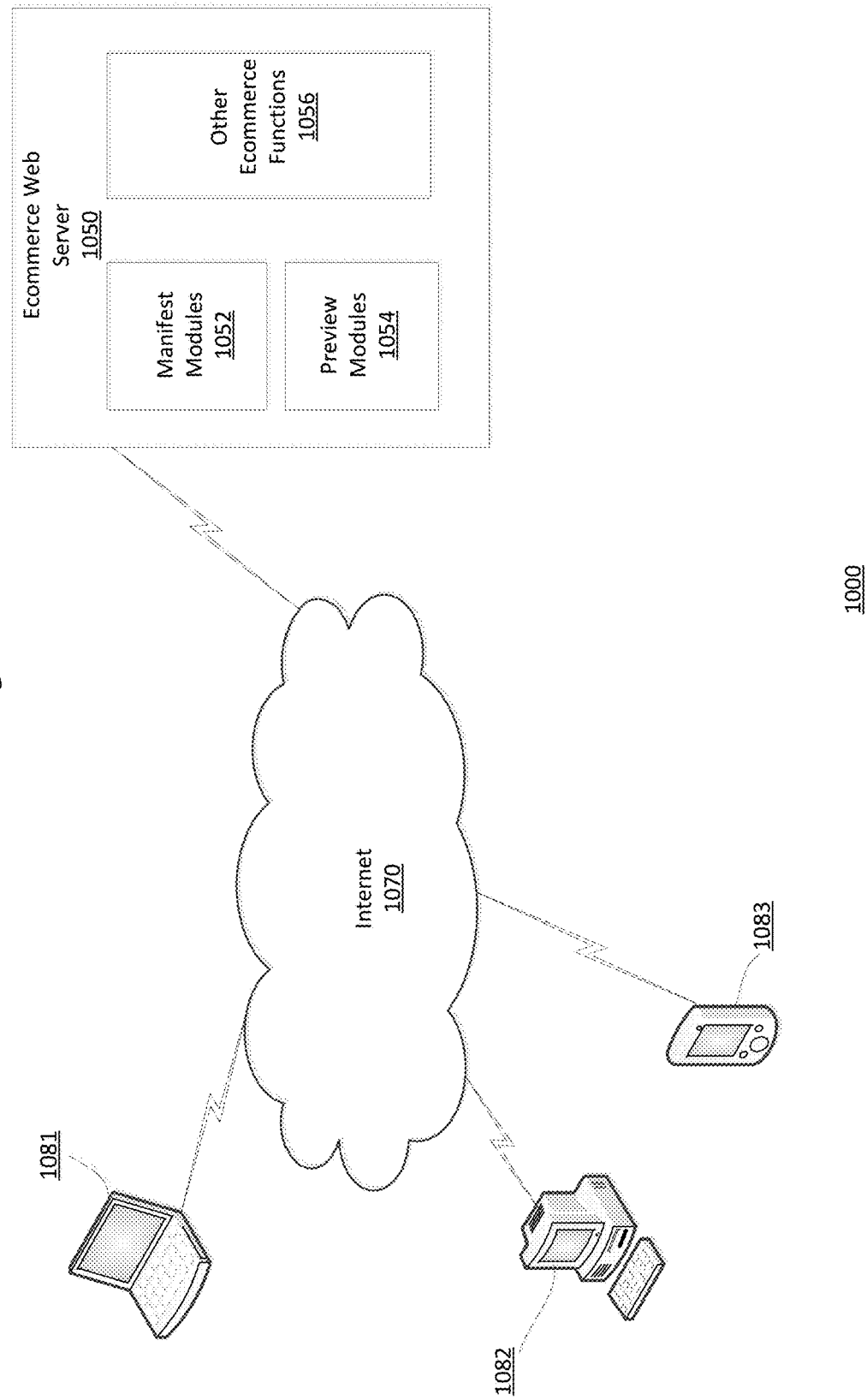
FIG. 10 is an overview diagram of a network including network elements that implement embodiments of the present invention and/or interact with embodiments of the present invention.

FIG. 10 is an overview diagram of a network 1000 including network elements that implement embodiments of the present invention and/or interact with embodiments of the present invention. Example network 1000 includes business user devices 1081-1083 in communication with an ecommerce web server 1050 over the Internet 1070 or any other type of communications network. The example business user devices include a laptop computer 1081, a desktop computer 1082, and a smartphone 1083. However, any device that can connect to a web site over a network using a web browser or some other means can be used. Business user devices 1081-1083 and web server 1050 may communicate with each other using well-known communication protocols, such as Transmission Control Protocol ("TCP") and Internet Protocol ("IP"), or TCP/IP, HTTP and Extensible Markup Language ("XML").

Ecommerce server 1050 may implement the functionality of the embodiments of the invention. For example, manifest modules 1052 and preview modules 1054 may respectively implement the manifest and web page views described herein. To implement the embodiments described above, ecommerce web server 1050 may also provide the ecommerce functionality to business end users. The ecommerce functionality includes providing an ecommerce product catalog that stores information of all products available to view or purchase on the ecommerce web site. The information may include a description of the product, the price of the product, the inventory level of the product, a picture of the product, etc. Other ecommerce functionality 956 includes all other known ecommerce functionality, such as a shopping cart, a product recommendation generator, a product search engine including search refinements, etc.

As described in the various embodiments of the present invention that are described herein, the manifest view and corresponding web page view may be simultaneously displayed alongside one another. In addition, the subsections of the manifest view and the web page view may be synchronized such that changes made within the manifest view are displayed in web page view in real-time. Thus, by implementing the various embodiments, dynamically generated web sites may be more easily managed by business users. As a result, additional shopper experiences may be more easily provided. In addition, non-technical business users can now operate effectively without understanding the backend data sources and the underlying rules assembly model. It also is a more natural fit for more technical users to perform their tasks more quickly and effectively.

It will be apparent to those skilled in the art that various modifications and variations can be made in the manipulation of dynamically assembled ecommerce web pages of the present disclosure without departing from the spirit or scope of the disclosure. Thus, it is intended that the present disclosure cover the modifications and variations of this disclosure provided they come within the scope of the appended claims and their equivalents.

We claim:

1. A method for manipulating dynamically rendered content, the method comprising:
   generating a first visual representation of selectable backend data sources and a set of selectable rules, the first visual representation including a structural overview of the backend data sources and the rules and comprising a plurality of selectable subsections;
   generating a second visual representation, simultaneously with the first visual representation and within a single screen, of the backend data sources and the rules, the second visual representation comprising a web page view that is generated using a selection of the backend data sources and the rules from the first visual representation, wherein the web page view is formed of a plurality of web page subsections, each of the web page subsections corresponding to at least one of the selectable subsections that include the backend data sources and rules that dynamically generate the corresponding web page subsection;
   receiving, from a user, a change to one of the selectable backend data sources or selectable rules within the first visual representation via interaction with the first visual representation within a first subsection of the selectable subsections; and
   rendering a synchronized change within the second visual representation of the web page within a first subsection of the web page subsections that corresponds to the first subsection of the selectable subsections, wherein the web page is generated using at least one different backend data source or one different rule in response to the change via the first visual representation;
   wherein each selected backend data source comprises a database that is a source of data displayed on the second visual representation and each selected rule is used to configure and assemble the second visual representation using the selected backend data sources;
   wherein the synchronized change comprises simultaneously displaying the first visual representation as the change to one of the selectable backend data sources or selectable rules is entered and as the synchronized change within the second visual representation of the web page is rendered in response to the entered change.

2. The method according to claim 1, wherein an assembler generates the second visual representation from the backend sources, the assembler comprising a JavaScript Object Notation (JSON) module to retrieve dynamic content in response to a navigation of the user.

3. The method according to claim 1, wherein the first and second visual representations are synchronized such that changes made within the first visual representation are displayed in the second visual representation in real-time.

4. The method according to claim 1, further comprising when one of the selectable subsections is selected, highlighting the corresponding web page subsection while both the first visual representation and the second visual representation are simultaneously displayed.

5. The method according to claim 1, further comprising generating a run time assembly log corresponding to the web page view.

6. The method according to claim 1, further comprising:
   displaying differences between content and expected content of the first visual representation.

7. The method according to claim 1, further comprising:
   displaying differences between content and expected content of the second visual representation.

8. A non-transitory computer readable storage medium storing one or more programs configured to be executed by a processor, the one or more programs comprising instructions for:
   generating a first visual representation of selectable backend data sources and a set of selectable rules, the first visual representation including a structural overview of the backend data sources and the rules and comprising a plurality of selectable subsections;
   generating a second visual representation, simultaneously with the first visual representation and within a single screen, of the backend data sources and the rules, the second visual representation comprising a web page view that is generated using a selection of the backend data sources and the rules from the first visual representation, wherein the web page view is formed of a plurality of web page subsections, each of the web page subsections corresponding to at least one of the selectable subsections that include the backend data sources and rules that dynamically generate the corresponding web page subsection;

receiving, from a user, a change to one of the selectable backend data sources or selectable rules within the first visual representation via interaction with the first visual representation within a first subsection of the selectable subsections; and rendering a synchronized change within the second visual representation of the web page within a first subsection of the web page subsections that corresponds to the first subsection of the selectable subsections, wherein the web page is generated using at least one different backend data source or one different rule in response to the change via the first visual representation;

wherein each selected backend data source comprises a database that is a source of data displayed on the second visual representation and each selected rule is used to configure and assemble the second visual representation using the selected backend data sources;

wherein the synchronized change comprises simultaneously displaying the first visual representation as the change to one of the selectable backend data sources or selectable rules is entered and as the synchronized change within the second visual representation of the web page is rendered in response to the entered change.

9. The non-transitory computer readable storage medium according to claim 8, wherein an assembler generates the second visual representation from the backend sources, the assembler comprising a JavaScript Object Notation (JSON) module to retrieve dynamic content in response to a navigation of the user.

10. The non-transitory computer readable storage medium according to claim 8, wherein the first and second visual representations are synchronized such that changes made within the first visual representation are displayed in the second visual representation in real-time.

11. The non-transitory computer readable storage medium according to claim 8, further comprising when one of the selectable subsections is selected, highlighting the corresponding web page subsection while both the first visual representation and the second visual representation are simultaneously displayed.

12. The non-transitory computer readable storage medium according to claim 8, further comprising generating a run time assembly log corresponding to the web page view.

13. The non-transitory computer readable storage medium according to claim 8, further comprising instructions for:
displaying differences between content and expected content of the first visual representation.

14. The non-transitory computer readable storage medium according to claim 8, further comprising instructions for:
displaying differences between content and expected content of the second visual representation.

15. A device comprising:
a processor; and
a memory storing one or more programs for execution by the processor, the one or more programs including instructions for:
generating a first visual representation of selectable backend data sources and a set of selectable rules, the first visual representation including a structural overview of the backend data sources and the rules and comprising a plurality of selectable subsections;

generating a second visual representation, simultaneously with the first visual representation and within a single screen, of the backend data sources and the rules, the second visual representation comprising a web page view that is generated using a selection of the backend data sources and the rules from the first visual representation, wherein the web page view is formed of a plurality of web page subsections, each of the web page subsections corresponding to at least one of the selectable subsections that include the backend data sources and rules that dynamically generate the corresponding web page subsection;

receiving, from a user, a change to one of the selectable backend data sources or selectable rules within the first visual representation via interaction with the first visual representation within a first subsection of the selectable subsections; and rendering a synchronized change within the second visual representation of the web page within a first subsection of the web page subsections that corresponds to the first subsection of the selectable subsections, wherein the web page is generated using at least one different backend data source or one different rule in response to the change via the first visual representation;

wherein each selected backend data source comprises a database that is a source of data displayed on the second visual representation and each selected rule is used to configure and assemble the second visual representation using the selected backend data sources;

wherein the synchronized change comprises simultaneously displaying the first visual representation as the change to one of the selectable backend data sources or selectable rules is entered and as the synchronized change within the second visual representation of the web page is rendered in response to the entered change.

16. The device according to claim 15, wherein an assembler generates the second visual representation from the backend sources, the assembler comprising a JavaScript Object Notation (JSON) module to retrieve dynamic content in response to a navigation of the user.

17. The device according to claim 15, wherein the first and second visual representations are synchronized such that changes made within the first visual representation are displayed in the second visual representation in real-time.

18. The device according to claim 15, further comprising when one of the selectable subsections is selected, highlighting the corresponding web page subsection while both the first visual representation and the second visual representation are simultaneously displayed.

19. The device according to claim 15, further comprising generating a run time assembly log corresponding to the web page view.

20. The device according to claim 15, further comprising instructions for:
displaying differences between content and expected content of the first visual representation.

* * * * *